(12) United States Patent
Nakajima et al.

(10) Patent No.: US 8,292,775 B2
(45) Date of Patent: Oct. 23, 2012

(54) VEHICLE DIFFERENTIAL APPARATUS

(75) Inventors: Shinichiro Nakajima, Niiza (JP);
Takahiro Yoshiyama, Kawagoe (JP);
Tsune Kobayashi, Aichi-ken (JP)

(73) Assignee: JTEKT Corporation, Osaka-shi (JP)

( * ) Notice: Subject to any disclaimer, the term of this patent is extended or adjusted under 35 U.S.C. 154(b) by 526 days.

(21) Appl. No.: 12/534,399

(22) Filed: Aug. 3, 2009

(65) Prior Publication Data
US 2010/0029434 A1    Feb. 4, 2010

(30) Foreign Application Priority Data

Aug. 4, 2008   (JP) ................................. 2008-200933

(51) Int. Cl.
*F16H 48/06* (2006.01)

(52) U.S. Cl. ........................................ 475/230; 475/248

(58) Field of Classification Search ................... 475/230
See application file for complete search history.

(56) References Cited

U.S. PATENT DOCUMENTS

| | | | | |
|---|---|---|---|---|
| 1,835,525 | A | * | 12/1931 | Robbins ........................ 475/247 |
| 4,091,776 | A | * | 5/1978 | Clemens et al. ............ 123/90.15 |
| 5,647,814 | A | * | 7/1997 | Krisher ......................... 475/230 |
| 5,749,801 | A | | 5/1998 | Teraoka et al. |
| 6,027,423 | A | * | 2/2000 | Bell ............................. 475/230 |
| 6,283,889 | B1 | | 9/2001 | Bordner |
| 6,293,891 | B1 | | 9/2001 | Irwin et al. |
| 7,306,537 | B2 | * | 12/2007 | Nakajima ..................... 475/230 |
| 8,092,335 | B2 | * | 1/2012 | Suzuki et al. ................. 475/230 |
| 2008/0058150 | A1 | | 3/2008 | Kim |
| 2008/0194373 | A1 | | 8/2008 | Suzuki et al. |
| 2009/0118054 | A1 | | 5/2009 | Nakajima |

FOREIGN PATENT DOCUMENTS

| | | |
|---|---|---|
| DE | 103 54 997 A1 | 4/2005 |
| GB | 1 290 542 | 9/1972 |
| JP | 4-132245 | 12/1992 |
| JP | 2520728 | 10/1996 |

OTHER PUBLICATIONS

Extended Search Report issued Apr. 6, 2011 in Europe Application No. 09167081.0.

* cited by examiner

*Primary Examiner* — David D Le
*Assistant Examiner* — Derek D Knight
(74) *Attorney, Agent, or Firm* — Oblon, Spivak, McClelland, Maier & Neustadt, L.L.P.

(57) ABSTRACT

A vehicle differential apparatus includes: a differential case; two side gears; and two pinions. An axial center of each pinion is provided with a first pinion shaft insertion hole. A pinion shaft is inserted in the first pinion shaft insertion holes. An inner peripheral surface of the first pinion shaft insertion hole of each pinion is provided with two sliding surfaces that are slidable on one of two pinion inner peripheral surface-supporting portions of the pinion shaft, and a non-contacting surface that is not able to contact the pinion inner peripheral surface-supporting portion. The sliding surfaces and the non-contacting surface of each first pinion shaft insertion hole are disposed at positions adjacent to each other in the axis direction of the first pinion shaft insertion hole.

10 Claims, 5 Drawing Sheets

VEHICLE DIFFERENTIAL APPARATUS

INCORPORATION BY REFERENCE

The disclosure of Japanese Patent Application No. 2008-200933 filed on Aug. 4, 2008 including the specification, drawings and abstract is incorporated herein by reference in its entirety.

BACKGROUND OF THE INVENTION

1. Field of the Invention

The invention relates to a vehicle differential apparatus and, more particularly, to a vehicle differential apparatus that has pinions that receive rotation drive force from a drive side, and side gears that mesh with the pinions so that the gear axis of the side gears is orthogonal to the gear axis of the pinions.

2. Description of the Related Art

A known vehicle differential apparatus has a differential case that rotates when it receives engine torque, a pair of side gears that are disposed side by side along a rotation axis line of the differential case, a pair of pinions that mesh with the pair of side gears, and a pinion shaft that supports the pinions (e.g., Japanese Utility Model Registration No. 2520728).

The differential case is provided with a housing space in which the two side gears and the two pinions are housed, and pinion insertion holes that communicate with the housing space. Besides, the differential case is provided also with a pair of axle shaft insertion holes that communicate with the housing space and that are open in a direction orthogonal to the axis line of the pinions.

Each of the two side gears is made up of a bevel gear that has a boss portion, and a gear portion, and is disposed movably along the rotation axis line of the differential case. Besides, the boss portion of each side gear is inserted into an axle shaft insertion hole, so that the side gears are supported freely rotatably within the differential case. Left and right axle shafts are inserted, respectively, into central holes of the two side gears. An inner peripheral portion of the central hole of each side gear is spline-fitted to its corresponding axle shaft.

Each of the pinions is a bevel gear that has a gear barrel portion whose outer periphery is not provided with gear teeth, and a gear toothed portion whose outer periphery is provided with gear teeth. The circumferential outer peripheral surface of the gear barrel portion of each pinion slides on an inner peripheral surface of a corresponding one of pinion insertion holes of the differential case. That is, the pinions are supported so as to be freely rotatable relative to the differential case. Each pinion has at its axial center position a shaft insertion hole through which a pinion shaft is inserted.

The pinion shaft is interposed between the two side gears, and is disposed in the housing space in the differential case. Besides, the pinion shaft is provided so as to be slidable on the inner peripheral surface of the shaft insertion hole of each pinion, and therefore supports the pinions freely rotatably.

Due to the foregoing construction, when torque is input from the vehicle's engine side to the differential case via the drive pinions and the ring gear, the differential case is rotated about the rotation axis line of the differential case. As the differential case is rotated, the turning force is transmitted to the pinions, and then is transmitted from the pinions to the side gears. Since the axle shafts are respectively linked to the side gears by spline fitting, the torque from the engine side is distributed to the axle shafts according to the situation of operation of the vehicle. Specifically, the torque from the engine side is transmitted to the left/right axle shafts via the drive pinions, the ring gear, the differential case, the pinions, and the side gears in that order.

When the pinions rotate, the outer peripheral surfaces of the gear barrel portions of the pinions slide on the inner peripheral surfaces of the pinion gear insertion holes of the differential case, and simultaneously the inner peripheral surfaces of the shaft insertion holes of the pinions slide on the outer peripheral surface of the pinion shaft. Therefore, friction occurs between the pinions and the differential case, and between the pinions and the pinion shaft. Due to this friction resistance, the rotation of the pinions about their own axes is suppressed, so that the differential rotation of the two side gears is restricted.

Besides, due to the rotation of the pinions, thrust force occurs on each side gear, moving the side gears in such directions as to move away from each other, so that each side gear is pressed against a peripheral edge of the opening of a corresponding one of axle shaft insertion holes. Therefore, friction occurs between each side gear and the peripheral edge of the opening of a corresponding one of the axle shaft insertion holes. This friction resistance, too, restricts the differential rotation of the two side gears.

In order to obtain sufficiently large differential restriction torque in the foregoing type of vehicle differential apparatus, it is important that the inner peripheral surface of the shaft insertion hole of each pinion and the outer peripheral surface of the pinion shaft frictionally slide on each other, with the axis line of each pinion being parallel to the axis line of the pinion shaft. Therefore, in order to minimize the clearance between the inner peripheral surface of the shaft insertion hole of each pinion and the outer peripheral surface of the pinion shaft, the inner peripheral surface of the shaft insertion hole of each pinion is machined or processed so that the diameter of the inner peripheral surface of the shaft insertion hole is uniform along the axis line of the pinion shaft (or along the axis line of the pinions).

Because of this, when the differential case rotates, the reaction force from the pinion shaft to the pinions which occurs due to the meshing between the pinions and the side gears act in a direction orthogonal to the axis line of the pinion shaft. While this state is maintained, the inner peripheral surface of the shaft insertion hole of each pinion frictionally slides on the outer peripheral surface of the pinion shaft.

However, according to the vehicle differential apparatus manufactured so that the size of the clearance between the inner peripheral surface of the shaft insertion hole of each pinion and the outer peripheral surface of the pinion shaft is uniform along the axis line of the pinion shaft, it is not determinable which parts of the inner peripheral surface of the shaft insertion hole of each pinion and the outer peripheral surface of the pinion shaft contact each other. That is, it is difficult to perfectly uniformly form the small gap between the inner peripheral surface of the shaft insertion hole of each pinion and the outer peripheral surface of the pinion shaft. In reality, this gap is non-uniform due to the machining or processing error. In the case where a near-center portion of the shaft insertion hole of a pinion contacts the outer peripheral surface of the pinion shaft, lubricating oil is not delivered to the entire area of the inner peripheral surface of the shaft insertion hole of the pinion, thus giving rise to a possibility of occurrence of wearing or seizing.

SUMMARY OF THE INVENTION

Therefore, it is an object of the invention to provide a vehicle differential apparatus capable of suppressing occurrence of seizing of pinions and a pinion shaft.

A vehicle differential apparatus in accordance with an aspect of the invention includes: a differential case that rotates by drive force from a drive source; a pair of side gears that are rotatably housed in the differential case; a pair of pinions whose gear axes are each orthogonal to gear axes of the side gears, and each of which has at an axial center thereof a first pinion shaft insertion hole, and which mesh with the side gears; and a pinion shaft that is inserted in the first pinion shaft insertion holes of the pinions, and is housed in the differential case. The pinion shaft has a pair of pinion inner peripheral surface-supporting portions that face inner peripheral surfaces of the first pinion shaft insertion holes, and that rotatably support the two pinions. The inner peripheral surface of the first pinion shaft insertion hole of each of the pinions is provided with a pair of sliding surfaces that are slidable on one of the two pinion inner peripheral surface-supporting portions of the pinion shaft, and with a non-contacting surface that is not able to contact the one of the pinion inner peripheral surface-supporting portions, and the sliding surfaces and the non-contacting surface are disposed at positions that are adjacent to each other in an axis direction of the first pinion shaft insertion hole.

According to the foregoing aspect of the invention, occurrence of seizing of the pinions and the pinion shaft can be suppressed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
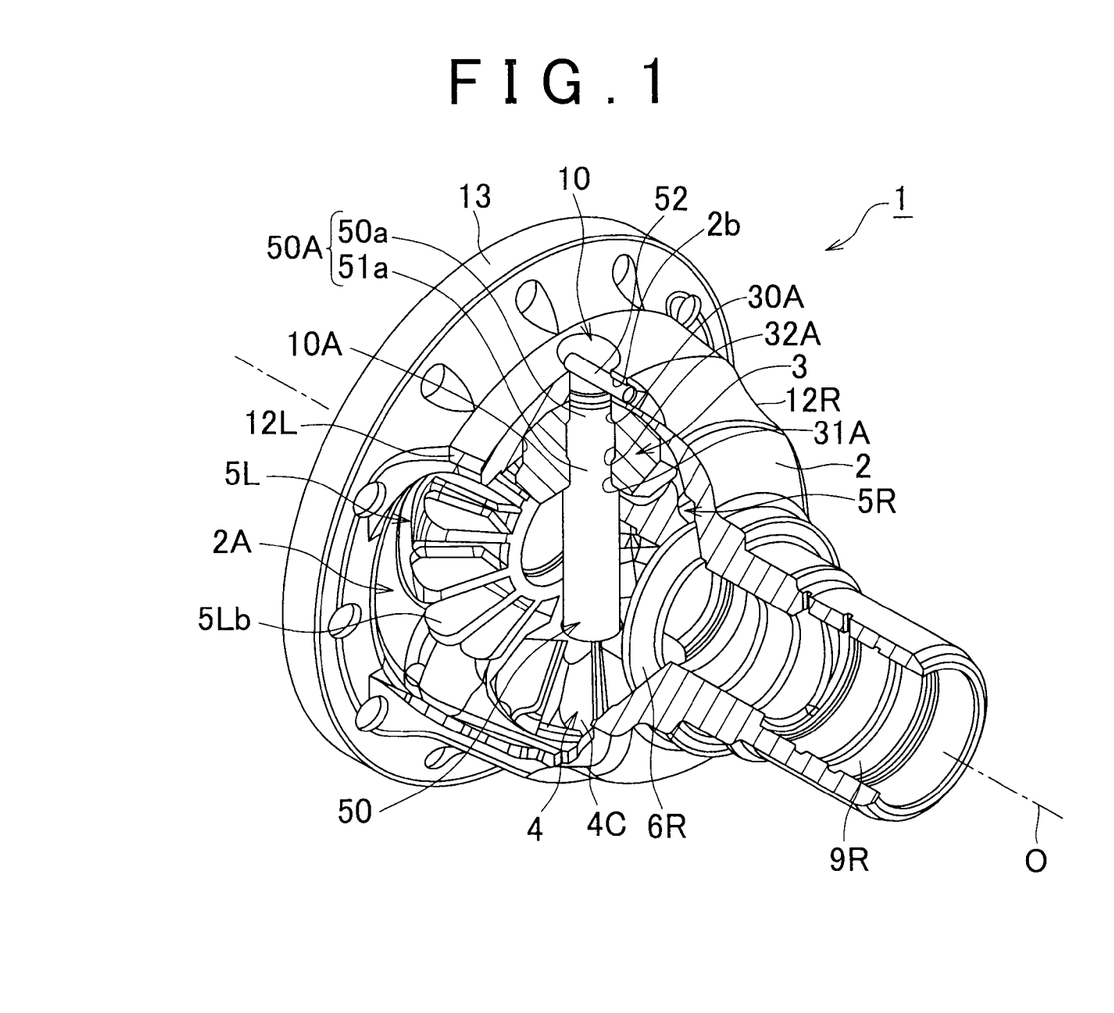
FIG. 1 is a partially cut-away perspective view for describing an overall construction of a vehicle differential apparatus in accordance with a first embodiment of the invention.
Figure 2:
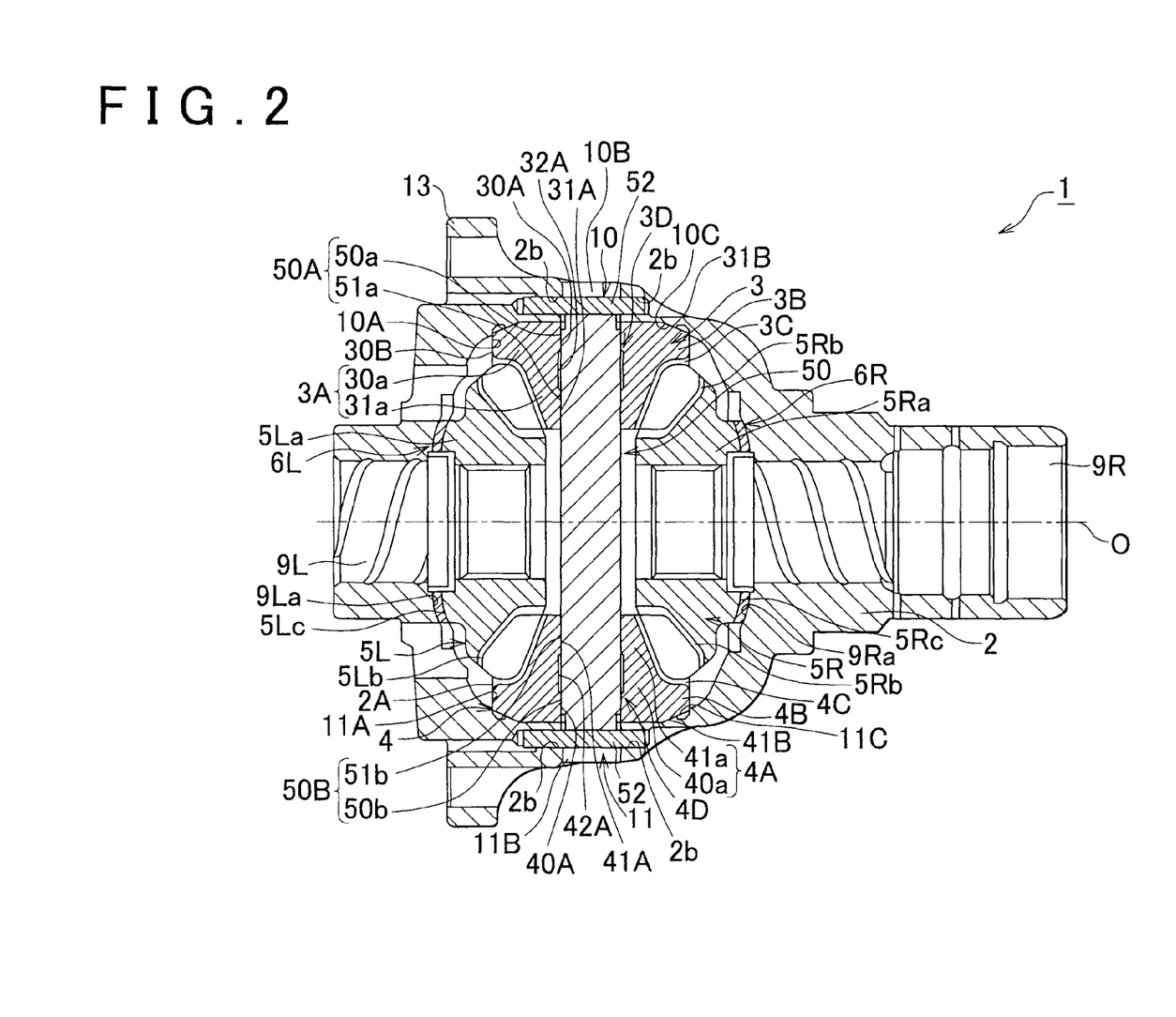
FIG. 2 is a sectional view of the vehicle differential apparatus in accordance with the first embodiment of the invention, taken in parallel with a rotation axis line of a differential case.
Figure 3:
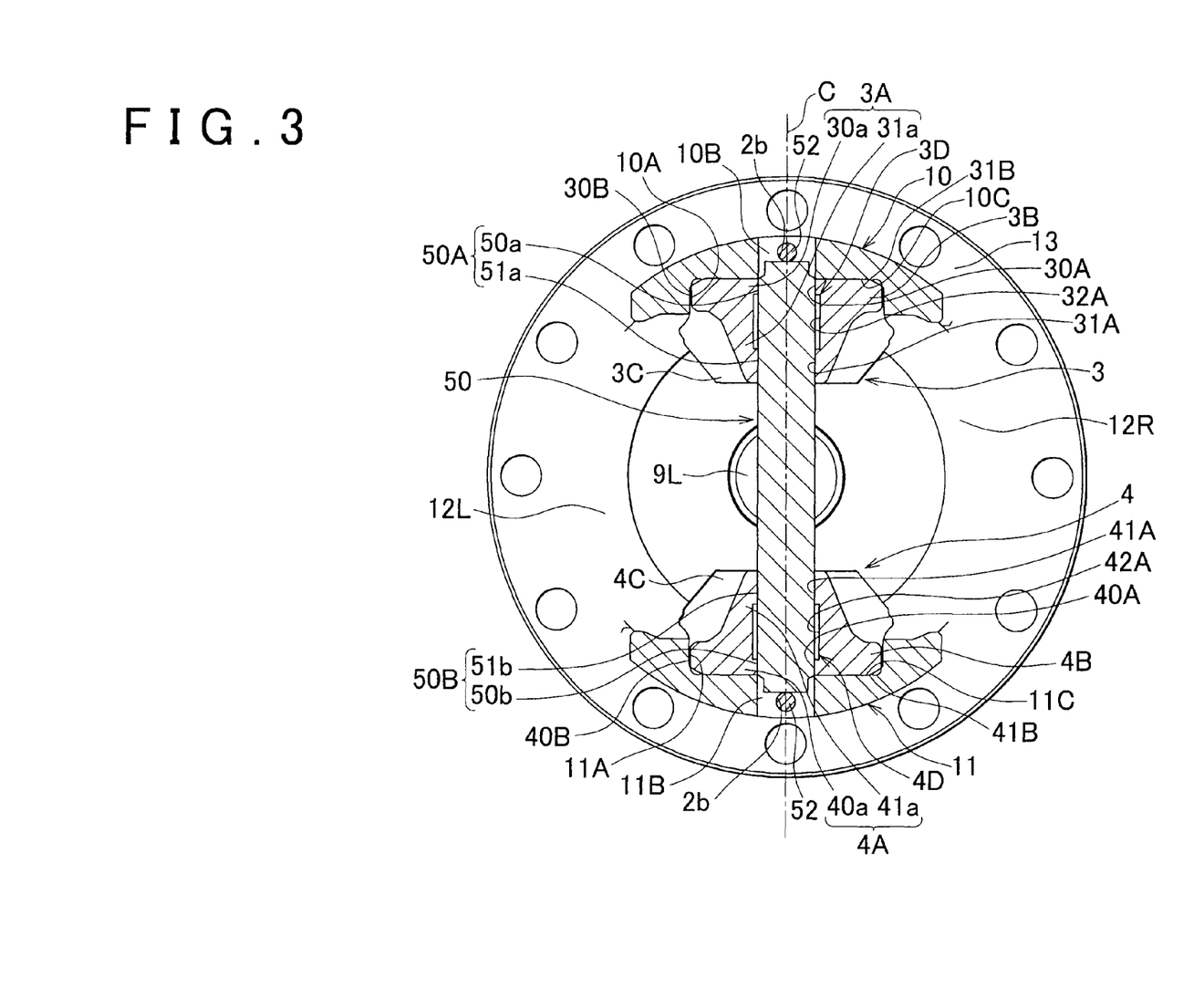
FIG. 3 is a sectional view of the vehicle differential apparatus in accordance with the first embodiment of the invention, taken in a direction of the right angle to the rotation axis line of the differential case.
Figure 4:
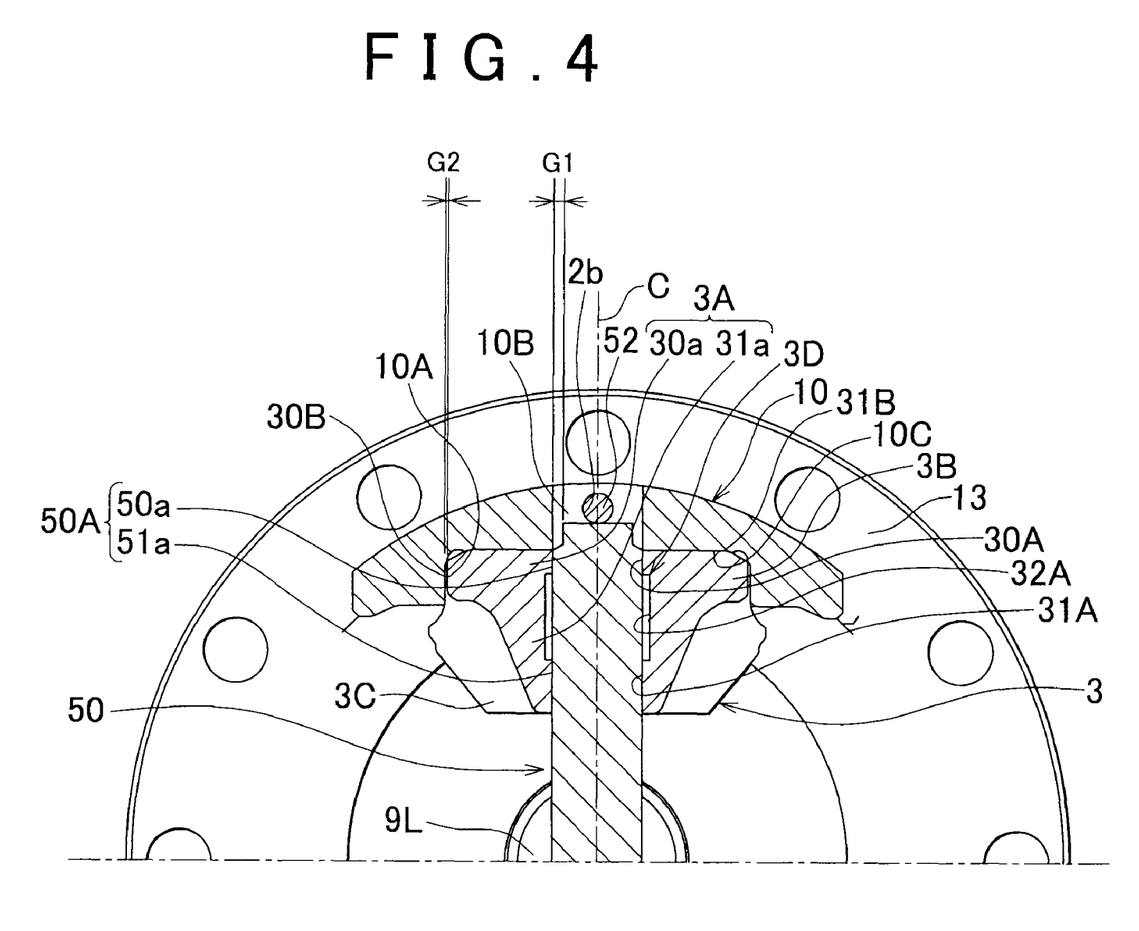
FIG. 4 is an enlarged sectional view of portions of the vehicle differential apparatus in accordance with the first embodiment of the invention.

FIG. 1 is a partially cut-away perspective view for describing an overall construction of a vehicle differential apparatus in accordance with a first embodiment of the invention. FIG. 2 is a sectional view of the vehicle differential apparatus in accordance with the first embodiment of the invention, taken in parallel with a rotation axis line of a differential case. FIG. 3 is a sectional view of the vehicle differential apparatus in accordance with the first embodiment of the invention, taken in a direction of the right angle to the rotation axis line of the differential case. FIG. 4 is an enlarged sectional view of portions of the vehicle differential apparatus in accordance with the first embodiment of the invention.

In FIGS. 1 to 3, a vehicle differential apparatus represented by reference character 1 is constructed substantially of a differential case 2 that rotates when it receives engine torque, a pinion shaft 50 positioned on an axis line that is orthogonal to a rotation axis line O of the differential case 2, a pair of pinions 3 and 4 that are juxtaposed on the pinion shaft 50, a pair of side gears 5L and 5R that mesh with the two pinions 3 and 4, respectively, with the gear axis of the side gears being orthogonal to the gear axis of the pinions, and a pair of thrust washers 6L and 6R that are disposed on back sides of the side gears 5L and 5R, respectively.

The differential case 2, as shown in FIG. 2, has therein a housing space 2A that houses the pinions 3 and 4, the side gears 5L and 5R, and the thrust washers 6L and 6R. The entire body of the differential case 2 is formed by a one-piece member.

The differential case 2, as shown in FIG. 2, is provided with axle shaft insertion holes 9L and 9R that are open along the rotation axis line O, and second pinion shaft insertion holes 10 and 11 that each have an axis line in a direction orthogonal to the axis line of the axle shaft insertion holes 9L and 9R. Besides, an inner peripheral surface of each of the second pinion shaft insertion holes 10 and 11 is provided with a pair of pin attachment holes 2b and 2b that face each other. Besides, the differential case 2 is provided with a pair of side gear passage holes 12L and 12R at positions symmetrical about the rotation axis line O as shown in FIGS. 1 and 3. The side gear passage holes 12L and 12R are provided at sites that are 90 degrees offset with respect to the axis line of the second pinion shaft insertion holes 10 and 11 and that are along the rotation axis line O. In a left axle shaft side of the differential case 2, an annular ring gear attachment flange 13 is provided integrally therewith so that the flange 13 is orthogonal to the rotation axis line O. Incidentally, the ring gear is not shown in the drawings.

The axle shaft insertion holes 9L and 9R are formed by penetration holes that are open in a direction along the rotation axis line O, as shown in FIG. 2. A left-side axle shaft (not shown) is inserted in the axle shaft insertion hole 9L, and a right-side axle shaft (not shown) is inserted in the axle shaft insertion hole 9R. Peripheral edges of the openings of the axle shaft insertion holes 9L and 9R are provided with thrust washer receptacles 9La and 9Ra which are formed by spherical surfaces that receive the thrust washers 6L and 6R, respectively.

The second pinion shaft insertion holes 10 and 11 are formed by penetration holes (circular holes) which are open to the inside and the outside of the differential case 2 in their axis direction that is orthogonal to the rotation axis line O, and which each have a stepped hole shape such that the inside diameter thereof is larger at an inner opening end portion than at an outer opening end portion. The inner-side opening size (inner-side inside diameter) of the second pinion shaft insertion holes 10 and 11 is set substantially equal to the outside diameter of the pinions 3 and 4. That is, the inner-side opening size (inner-side inside diameter) of the second pinion shaft insertion holes 10 and 11 is set smaller than the outside diameter of the side gears 5L and 5R.

At a site on the inner peripheral surface of each of the second pinion shaft insertion holes 10 and 11 which is near a central portion of the pinion shaft 50 in its axis direction, a first pinion support surface 10A or 11A is formed as a pinion outer peripheral surface-supporting portion. The first pinion support surfaces 10A and 11A freely slidably and rotatably support outer peripheral surfaces of gear collar portions 3B and 4B of the pinions 3 and 4. A first distance in a radial direction from the rotation axis line O of the differential case 2 to one of the first pinion support surfaces 10A and 11A at a position parallel to the axis line of the pinion shaft 50 is set greater than a second distance in a radial direction from the rotation axis line O of the differential case 2 to one of the meshing center points at which the pinions 3 and 4 mesh with the side gears 5L and 5R (i.e., to the load centers in contact regions in which the tooth faces of the pinions 3 and 4 and the tooth faces of the side gears 5L and 5R contact each other when torque is transmitted from the pinions 3 and 4 to the side gears 5L and 5R) at the position parallel to the axis line of the pinion shaft 50.

Pinion shaft non-support surfaces 10B and 11B are provided at positions on the inner peripheral surfaces of the second pinion shaft insertion holes 10 and 11 which are more remote from the rotation axis line O of the differential case 2 than the first pinion support surfaces 10A and 11A are from the rotation axis line O. The inside diameter of the pinion shaft non-support surfaces 10A and 11B is smaller than the inside diameter of the first pinion support surfaces 10A and 11A. Each of the pinion shaft non-support surfaces 10A and 11B faces a corresponding one of the two end portions of the pinion shaft 50. Voids are formed between the pinion shaft non-support surfaces 10B and 11B and the outer peripheral surfaces of the two end portions of the pinion shaft 50. That is, the voids are formed because the inside diameter of the pinion shaft non-support surfaces 10B and 11B is set greater than the outside diameter of the two end portions of the pinion shaft 50.

Step surfaces that link the first pinion support surfaces 10A and 11A and the pinion shaft non-support surfaces 10B and 11B of the second pinion shaft insertion holes 10 and 11 are provided with pinion receptacle portions 10C and 11C that are formed in a spherical shape that has a predetermined curvature.

The pin attachment holes 2b and 2b, as shown in FIG. 2, are open in a direction parallel to the rotation axis line O in the pinion shaft non-support surfaces 10B and 11B of the inner peripheral surfaces of the second pinion shaft insertion holes 10 and 11. Two end portions of each of pins 52 and 52 that constrain the movement of the pinion shaft 50 in its axis direction are fixed to the pin attachment holes 2b and 2b. Therefore, the pinion shaft 50 is prevented from falling apart in its axis direction.

The side gear passage holes 12L and 12R are formed as penetration holes that penetrate the differential case 2 as shown in FIGS. 1 and 3. The opening size of the side gear passage holes 12L and 12R is set to a size that allows the pinions 3 and 4 and the side gears 5L and 5R to be inserted into the differential case 2.

The pinion shaft 50, as shown in FIG. 2, has second pinion support surfaces 50A and 50B as pinion inner peripheral surface-supporting portions that are slidable relative to the inner peripheral surfaces of first pinion shaft insertion holes 3D and 4D of the pinions 3 and 4, and that support the pinions 3 and 4 freely rotatably. Besides, the pinion shaft 50 is disposed in a state where the pinion shaft 50 is inserted in the first pinion shaft insertion holes 3D and 4D of the pinions 3 and 4, and the two end portions of the pinion shaft 50 are inserted in the second pinion shaft insertion holes 10 and 11 of the differential case 2. Then, about the gear axis of the side gears 5L and 5R (about the rotation axis line O of the differential case 2), a dimension $G_1$ of a gap between the pinion shaft 50 and the pinion shaft non-support surfaces 10B and 11B of the second pinion shaft insertion holes 10 and 11 of the differential case 2 is set greater than a dimension $G_2$ of a gap between the first pinion support surfaces 10A and 11A of the second pinion shaft insertion holes 10 and 11 of the differential case 2 and the outer peripheral surfaces of the gear collar portions 3B and 4B of the pinions 3 and 4 ($G_1 > G_2$). This setting prevents an incident that the two end portions of the pinion shaft 50 contact the pinion shaft non-support surfaces 10B and 11B of the second pinion shaft insertion holes 10 and 11 of the differential case 2.

The second pinion support surface 50A of the pinion shaft 50 is made up of pinion inner peripheral surface-supporting portions 50a and 51a that are juxtaposed with an interval therebetween. The second pinion support surface 50A of the pinion shaft 50 is located at an end side of the pinion shaft 50. A third distance in a radial direction from the rotation axis line O of the differential case 2 to the first pinion inner peripheral surface-supporting portion 50a at a position parallel to the axis line of the pinion shaft 50 is set greater than the second distance in a radial direction from the rotation axis line O of the differential case 2 to one of the meshing center points at which the pinion 3 mesh with the side gears 5L and 5R at a position parallel to the axis line of the pinion shaft 50. Besides, a fourth distance in a radial direction from the rotation axis line O of the differential case 2 to at least a portion of the second pinion inner peripheral surface-supporting portion 51a at a position parallel to the axis line of the pinion shaft 50 is set smaller than the second distance in a radial direction from the rotation axis line O of the differential case 2 to one of the meshing center points at which the pinion 3 mesh with the side gears 5L and 5R at a position parallel to the axis line of the pinion shaft 50. The first pinion inner peripheral surface-supporting portion 50a is located nearer to the corresponding side end portion of the pinion shaft 50 than the second pinion inner peripheral surface-supporting portion 51a is to the same side end portion.

The second pinion support surface 50B of the pinion shaft 50 is made up of pinion inner peripheral surface-supporting portions 50b and 51b that are juxtaposed with an interval therebetween. The pinion inner peripheral surface-supporting portions 50b and 51b are located at the other end side of the pinion shaft 50. A third distance in a radial direction from the rotation axis line O of the differential case 2 to the first pinion inner peripheral surface-supporting portion 50b at a position parallel to the axis line of the pinion shaft 50 is set greater than the second distance in a radial direction from the rotation axis line O of the differential case 2 to one of the meshing center points at which the pinion 4 mesh with the side gears 5L and 5R at a position parallel to the axis line of the pinion shaft 50. Besides, a fourth distance in a radial direction from the rotation axis line O of the differential case 2 to at least a portion of the second pinion inner peripheral surface-supporting portion 51b at a position parallel to the axis line of the pinion shaft 50 is set smaller than the second distance in a radial direction from the rotation axis line O of the differential case 2 to one of the meshing center points at which the pinion 4 mesh with the side gears 5L and 5R at a position parallel to the axis line of the pinion shaft 50. The first pinion inner peripheral surface-supporting portion 50b is located nearer to the corresponding side end portion (the second side end portion) of the pinion shaft 50 than the second pinion inner peripheral surface-supporting portion 51b is to the same side end portion. It is to be noted herein that the foregoing distance in a radial direction is a distance between the rotation axis line O of the differential case 2 and a rotation locus of a site as mentioned above which is formed when the differential case 2 rotates about the rotation axis line O. Therefore, the distance in a radial direction can also be referred to as the radius of the rotation locus of the site concerned.

Since the pinions 3 and 4 have substantially the same construction, and therefore, for example, the pinion 3, will solely be described below. Incidentally, with regard to the pinion 4, various sites are represented by reference characters that correspond to the reference characters of corresponding sites of the pinion 3 (e.g., a gear barrel portion of the pinion 4 is represented by 4A, corresponding to a gear barrel portion 3A of the pinion 3, and a gear collar portion of the pinion 4 is represented by 4B, corresponding to a gear collar portion 3B of the pinion 3), and descriptions of those sites are omitted below.

The pinion 3, as shown in FIG. 2, is a bevel gear that has the gear barrel portion 3A whose center axis line is a gear axis line C (shown in FIG. 4), a gear collar portion 3B as a first supported portion that is protruded on the outside of the gear barrel portion 3A, and a gear portion 3C (a meshing portion that meshes with the side gears 5L and 5R) that is located on the side gear side of the gear collar portion 3B. The pinion 3 is freely rotatably supported by the first pinion support surface 10A of the second pinion shaft insertion hole 10, and the second pinion support surface 50A of the pinion shaft 50.

The gear barrel portion 3A, as show in FIG. 2, has in its axial center portion (a site that includes the center axis line) a first pinion shaft insertion hole 3D in which the pinion shaft 50 is inserted. The gear barrel portion 3A is formed by a circular tubular body made up of a first gear barrel portion 30$a$ that is generally annular as a whole, and a second gear barrel portion 31$a$ that has a shape that is generally frustum of a cone.

The first pinion shaft insertion hole 3D, as shown in FIG. 2, is formed by a circular hole that has two types of inner peripheral surfaces, that is, a larger type and a smaller type, whose inside diameters are different from each other. Of the inner peripheral surfaces of the first pinion shaft insertion hole 3D, two small-inside diameter inner peripheral surfaces are adjacent to each other via a large-inside diameter inner peripheral surface. The two small-inside diameter inner peripheral surfaces are formed by a second sliding surface 30A as a second supported portion and a third sliding surface 31A as a third supported portion that slide on the pinion gear inner periphery surface-supporting portions 50$a$ and 51$a$ of the second pinion support surface 50A of the pinion shaft 50. The second sliding surface 30A and the third sliding surface 31A of the first pinion shaft insertion hole 3D of the pinion 3 are provided on the two opposite end sides of the first pinion shaft insertion hole 3D in its axis direction.

On the other hand, the large-inside diameter inner surface, of the inner peripheral surfaces of the first pinion shaft insertion hole 3D, intervenes between the second sliding surface 30A and the third sliding surface 31A. That is, the large-inside diameter inner peripheral surface, of the inner peripheral surfaces of the first pinion shaft insertion hole 3D, is disposed at a position adjacent to the second sliding surface 30A and to the third sliding surface 31A in the axis direction of the first pinion shaft insertion hole 3D. The large-inside diameter inner peripheral surface of the inner peripheral surfaces of the first pinion shaft insertion hole 3D is formed as a non-contacting surface 32A that does not contact the outer peripheral surface of the pinion shaft 50. That is, the non-contacting surface 32A of the first pinion shaft insertion hole 3D is formed by recessing the inner peripheral surface of the first pinion insertion hole 3D in a radial direction of the first pinion insertion hole 3D. Therefore, lubricating oil is held between the non-contacting surface 32A and the outer peripheral surface of the pinion shaft 50. Hence, lubricating oil is sufficiently supplied to a space between the outer peripheral surface of the pinion shaft 50 and the second sliding surface 30A of the pinion 3, and to a space between the outer peripheral surface of the pinion shaft 50 and the third sliding surface 31A.

The first gear barrel portion 30$a$ is positioned on the gear back surface side of the gear barrel portion 3A, and the second barrel portion 31$a$ is positioned on the gear portion 3C side of the gear barrel portion 3A (the side of the gear barrel portion 3A that is opposite the gear back surface side). The gear collar portion 3B is disposed on the outer peripheral surface of the first gear barrel portion 30$a$, and a dedendum of the gear portion 3C is disposed on the outer peripheral surface of the second gear barrel portion 31$a$.

It is to be noted herein that the "gear back surface" refers to one of the two opposite end surfaces of the pinion 3 in its gear axis direction which is remote from the rotation axis line O of the differential case 2.

The gear collar portion 3B, as shown in FIG. 2, is provided integrally over the entire circumference of the outer peripheral surface of the first gear portion 30$a$, and the entire body thereof is formed by an annular body whose outside diameter is uniform in the gear axis direction. The gear collar portion 3B is constructed so as to function as a gear base portion having a generally letter-T sectional shape (a portion of the pinion 3 that excludes the gear portion 3C).

The outer peripheral surface of the gear collar portion 3B is formed by the first sliding surface 30B as a first supported portion that slides on the first pinion support surface 10A of the second pinion shaft insertion hole 10.

The back surface of the gear collar portion 3B, as shown in FIG. 2, is formed by a fourth sliding surface 31B as a fourth supported portion that fits to the pinion receptacle portion 10C of the second pinion shaft insertion hole 10, and that slides on the pinion receptacle portion 10C.

The gear portion 3C, as shown in FIG. 2, does not include a portion that slides relative to the differential case 2, and is disposed at a position that is nearer to the rotation axis line O of the differential case 2 than the gear collar portion 3B is to the rotation axis line O. A portion of the gear back surface side of the gear portion 3C is provided integrally with the gear collar portion 3B.

Each of the side gears 5L and 5R, as shown in FIGS. 1 and 2, is a generally annular gear that has a boss portion 5La or 5Ra whose outside diameters are different from each other, and a gear portion 5Lb or 5Rb (i.e., a bevel gear that has a larger outside diameter than the pinions 3 and 4, and that has a single face angle). The side gears 5L and 5R are freely rotatably supported in the housing space 2A of the differential case 2, and are meshed with the pinions 3 and 4.

The back surface of each of the side gears 5L and 5R is provided with a sliding portion 5Lc or 5Rc made up of a spherical surface that fits to the thrust washer receptacle portion 9La or 9Ra, via the thrust washer 6L or 6R. After the left and right axle shafts (not shown) are inserted into the axle shaft insertion holes 9L and 9R, the left and right axle shafts are inserted and spline-fitted into the side gears 5L and 5R.

The thrust washers 6L and 6R, as shown in FIG. 2, are annular washers that adjust the meshing between the side gears 5L and 5R and the pinions 3 and 4. The thrust washers 6L and 6R are interposed between the sliding portions 5Lc and 5Rc of the side gears 5L and 5R and the thrust washer receptacle portions 9La and 9Ra. Then, the left and right axle shafts are inserted through the thrust washers 6L and 6R, so as to receive thrust force of the side gears 5L and 5R, respectively. The thrust washers 6L and 6R are each provided with lubricating oil introduction paths (not shown) that introduce lubricating oil from a washer's inner peripheral portion to a washer's outer peripheral portion.

When torque is input from the engine side of the vehicle to the differential case 2 via the drive pinions and the ring gear, the differential case 2 rotates about the rotation axis line O. As the differential case 2 rotates, the rotation force thereof is transmitted to the pinions 3 and 4, and then transmitted from the pinions 3 and 4 to the side gears 5L and 5R. In this case, since the left and right axle shafts (not shown) are spline-fitted to the left and right side gears 5L and 5R, torque from the engine side is transmitted to the left and right axle shafts via the drive pinions, the ring gear, the pinions 3 and 4, and the side gears 5L and 5R in that order.

In the case where the vehicle is traveling straight and there is no slip between the left and right wheels and the road surface, the torque transmitted from the engine side to the differential case 2 causes the pinions 3 and 4 to revolve about the center axis of the side gears 5L and 5R without rotating about their own axis. Therefore, the pinions 3 and 4, the side gears 5L and 5R, and the pinion shaft 50 rotate together with the differential case 2, so that the torque from the engine side is transmitted equally to the left and right axle shafts. Thus, the left and right axle shafts rotate at equal rotation speeds.

However, for example, in the case where the right-side wheel enters mud and a slip occurs between the wheel and the road surface, the pinions 3 and 4 each rotate about their own axis while being in mesh with the side gears 5L and 5R. Therefore, the torque from the engine side is differentially distributed between the left and right axle shafts (wheels), that is, the left-side wheel rotates at a speed that is lower than the rotation speed of the differential case 2, and the right-side wheel rotates at a speed that is higher than the rotation speed of the differential case 2. In this case, the two end portions of the pinion shaft 50 do not contact the differential case 2, so that the engine torque is not transmitted from the differential case 2 to the pinion shaft 50, but is transmitted only to the pinions 3 and 4. Therefore, as compared with the case where the pinion shaft 50 contacts the differential case 2, the proportion of the engine torque transmitted to the first sliding surfaces 30B and 40B of the pinions 3 and 4 via the first pinion support surfaces 10A and 11A of the differential case 2 is heightened.

In this embodiment, if the pinions 3 and 4 rotate about their own axis during a state in which the engine torque is acting on the differential case 2, the first sliding surfaces 30B and 40B of the pinions 3 and 4 slide on the first pinion support surfaces 10A and 11A of the differential case 2. Besides, the second sliding surfaces 30A and 40A of the pinions 3 and 4 slide on the first pinion inner peripheral surface-supporting portions 50a and 50b of the second pinion support surfaces 50A and 50B, respectively, of the pinion shaft 50. Besides, the third sliding surfaces 31A and 41A of the pinions 3 and 4 slide on the second pinion inner peripheral surface-supporting portions 51a and 51b of the second pinion support surfaces 50A and 50B, respectively, of the pinion shaft 50. However, since the engine torque is transmitted from the first sliding surfaces 30B and 40B of the pinions 3 and 4 to the pinions 3 and 4, the second sliding surfaces 30A and 40A and the third sliding surfaces 31A and 41A of the pinions 3 and 4 experiences degrees of pressing force such that the tilting of the pinions 3 and 4 can be suppressed. Specifically, since the first sliding surfaces 30B and 40B of the pinions 3 and 4, which are larger in diameter than the second sliding surfaces 30A and 40A and the third sliding surfaces 31A and 41A of the pinions 3 and 4, are more strongly pressed by the engine torque, relatively large friction resistance occurs between the first sliding surfaces 30B and 40B of the pinions 3 and 4 and the first pinion support surfaces 10A and 11A of the differential case 2. Due to the friction resistance occurring between the first sliding surfaces 30B and 40B of the pinions 3 and 4 and the first pinion support surfaces 10A and 11A of the differential case 2, the differential rotation of the side gears 5L and 5R is restricted, so that the slip that occurs between the left or right wheel and the road surface can be suppressed.

Besides, in this embodiment, as the pinions 3 and 4 rotate, thrust force occurs on the meshing surfaces between the pinions 3 and 4 and the side gears 5L and 5R, in the directions of the rotation axes of the gears. Due to this thrust force, the side gears 5L and 5R move in the directions away from each other, so that the thrust washers 6L and 6R pressingly contact the thrust washer receptacle portions 9La and 9Ra, respectively. Therefore, friction resistance occurs between the thrust washers 6L and 6R and the side gears 5L and 5R. This friction resistance also restricts the differential rotation of the side gears 5L and 5R. Furthermore, due to the thrust force occurring on the pinions 3 and 4, the fourth sliding surfaces 31B and 41B of the pinions 3 and 4 pressingly contact the pinion receptacle portions 10C and 11C of the differential case 2, so that friction resistance occurs due to the rotation of the pinions 3 and 4 about their own axis. This also restricts the differential rotation of the side gears 5L and 5R.

According to the foregoing first embodiment, effects as mentioned below are obtained.

Since the pinions 3 and 4 and the side gears 5L and 5R mesh at a theoretical meshing position, stable differential motion-restricting torque can be obtained.

Besides, lubricating oil is sufficiently supplied to spaces between the outer peripheral surface of the pinion shaft 50 and the second sliding surface 30A and the third sliding surface 31A of the pinion 3, and to spaces between the outer peripheral surface of the pinion shaft 50 and the second sliding surface 40A and the third sliding surface 41A of the pinion 4. Therefore, occurrence of seizing of the pinions 3 and 4 and the pinion shaft 50 can be suppressed.

As compared with the case where the engine torque is transmitted to the pinions via the differential case and the pinion shaft, the proportion of the engine torque transmitted to the pinions 3 and 4 can be heightened to a higher degree than in the related art, so that the torque bias ratio (TBR) can be set at an increased value.

Figure 5:
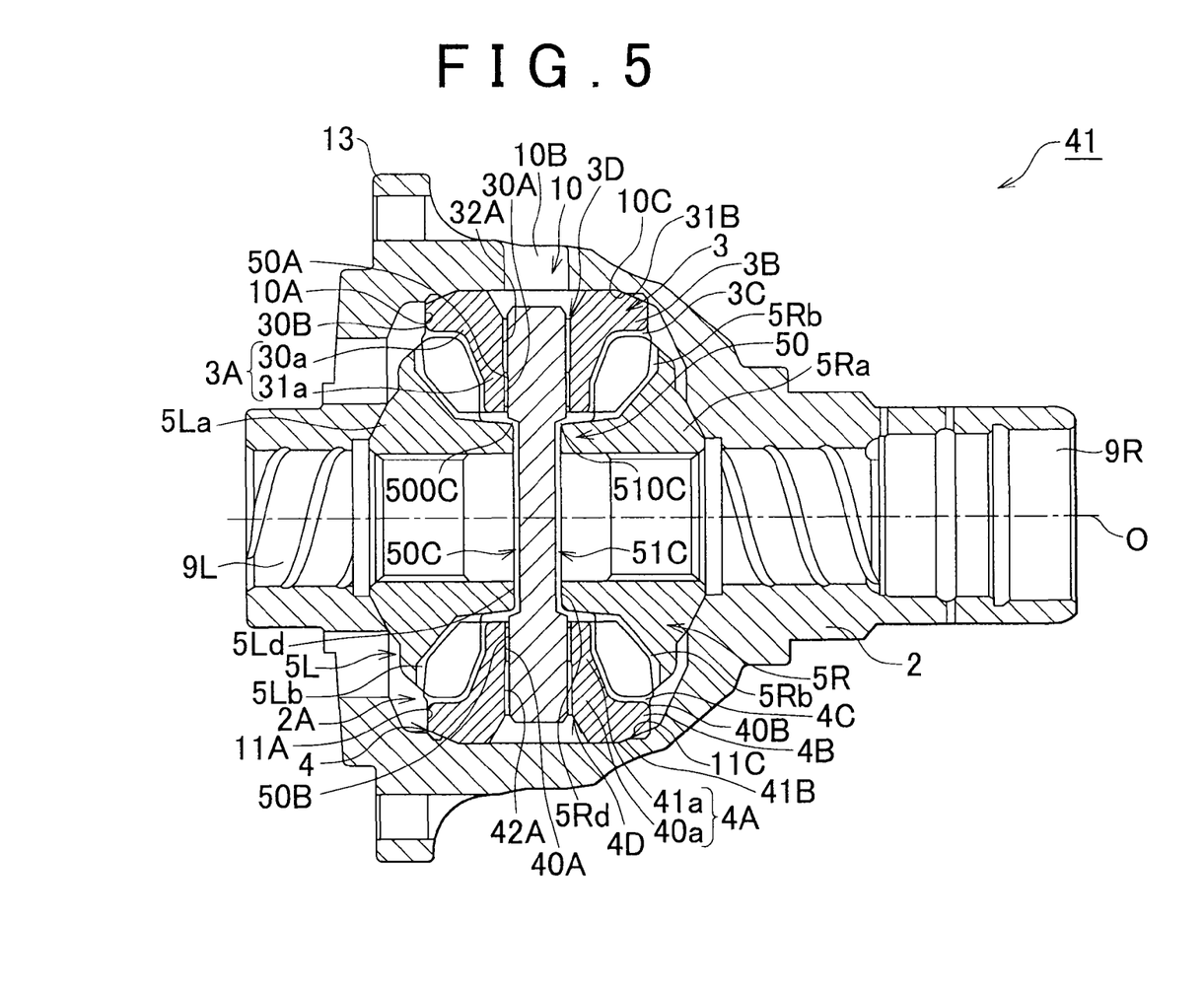
FIG. 5 is a sectional view for describing a vehicle differential apparatus in accordance with a second embodiment of the invention.

FIG. 5 is a sectional view for describing a vehicle differential apparatus in accordance with a second embodiment of the invention. Members and the like in FIG. 5 that are the same as or comparable to those in FIG. 2 are represented by the same reference characters, and detailed descriptions thereof are omitted below.

As shown in FIG. 5, a vehicle differential apparatus 41 in accordance with the second embodiment of the invention is characterized by including a pinion shaft 50 whose entire body is housed within a housing space 2A of a differential case 2.

Therefore, side gears 5L and 5R are provided with protruded portions 5Ld and 5Rd that are protruded toward a pinion shaft 50. The pinion shaft 50 is provided with parallel cutouts that are formed equiangularly (180 degrees) about the axis of the pinion shaft 50. These cutouts form flat surfaces 50C and 51C. While top surfaces of the protruded portions 5Ld and 5Rd of the side gears 5L and 5R are facing the flat surfaces 50C and 51C, respectively, of the pinion shaft 50, the protruded portions 5Ld and 5Rd of the side gears 5L and 5R are fitted to recess portions 500C and 510C, respectively, of the pinion shaft 50. Due to the fitting between the protruded portions 5Ld and 5Rd of the side gears 5L and 5R and the recess portions 500C and 510C of the pinion shaft 50, the movement of the pinion shaft 50 in the axis direction and the rotation thereof about the axis are restricted.

Incidentally, it is desirable to supply, for example, lubricating oil, to spaces between the protruded portions 5Ld and 5Rd of the side gears 5L and 5R and the recess portions 500C and 510C of the pinion shaft 50, as a preventative measure against seizing.

According to the foregoing second embodiment, effects mentioned below are obtained in addition to the foregoing effects of the first embodiment.

The restriction of the movement of the pinion shaft 50 in the axis direction and the restriction of the rotation thereof about the axis are carried out by using the side gears 5L and 5R without using a dedicated member. Therefore, the number of component parts can be cut down, and cost reduction can be achieved.

The second embodiment has been described in conjunction with the case where the restriction of the movement of the pinion shaft 50 in the axis direction and the restriction of the rotation thereof about the axis are carried out by providing the side gears 5L and 5R with the protruded portions 5Ld and 5Rd, and providing the pinion shaft 50 with the recess portions 500C and 510C that fit to the protruded portions 5Ld and 5Rd. However, the invention is not limited so. The movement of the pinion shaft in the axis direction and the rotation thereof about the axis may also be restricted by providing the side gears with recess portions, and providing the pinion shaft with protruded portions that fit to the recess portions of the side gears. Besides, in the second embodiment, the pinion shaft 50 is shorter than in the first embodiment, and the entire pinion shaft 50 is housed within the differential case 2. However, it is also permissible to adopt a structure in which the pinion shaft 50 is set at substantially the same length as in the first embodiment, and end portions of the pinion shaft 50 are inserted in the second pinion shaft insertion holes 10 and 11 of the differential case 2. In this case, also, the pins 52 can be eliminated while the movement of the pinion shaft 50 in the axis direction is restricted.

While the embodiments of the vehicle differential apparatus of the invention have described above, the invention is not limited to the foregoing embodiments or constructions, but can be carried out in various forms without departing from the gist of the invention.

Although in the foregoing embodiments, the differential case 2 is formed by a one-piece member, the invention is not limited to this construction, but the differential case may also be formed by a plurality of case elements.

What is claimed is:

1. A vehicle differential apparatus comprising:
   a differential case that rotates by drive force from a drive source;
   a pair of side gears that are rotatably housed in the differential case;
   a pair of pinions whose gear axes are each orthogonal to gear axes of the side gears, and each of which has at an axial center thereof a first pinion shaft insertion hole, and which mesh with the side gears; and
   a pinion shaft that is inserted in the first pinion shaft insertion holes of the pinions, and is housed in the differential case,
   wherein the pinion shaft has a pair of pinion inner peripheral surface-supporting portions that face inner peripheral surfaces of the first pinion shaft insertion holes, and that rotatably support the two pinions,
   wherein the inner peripheral surface of the first pinion shaft insertion hole of each of the pinions is provided with a pair of sliding surfaces that abut and are slidable on one of the two pinion inner peripheral surface-supporting portions of the pinion shaft, and with a non-contacting surface that is not able to contact the one of the pinion inner peripheral surface-supporting portions, and the sliding surfaces and the non-contacting surface are disposed at positions that are adjacent to each other in an axis direction of the first pinion shaft insertion hole,
   wherein the differential case has a pair of pinion outer peripheral surface-supporting portions that slidably support outer peripheral surfaces of the two pinions, respectively,
   wherein the differential case has a pair of second pinion shaft insertion holes into which the pinion shaft is inserted,
   wherein the pinion shaft is constrained from moving in an axis direction of the pinion shaft, and is disposed, with two end portions of the pinion shaft inserted respectively in the two second pinion shaft insertion holes, and
   wherein a dimension between the end portion of the pinion shaft and an inner peripheral surface of corresponding one of the second pinion shaft insertion holes is set larger than a dimension between the pinion outer peripheral surface-supporting portion and the outer peripheral surface of corresponding one of the pinions.

2. The vehicle differential apparatus according to claim 1, wherein
   the non-contacting surface of the each pinion is formed by recessing the inner peripheral surface of the first pinion shaft insertion hole in a radial direction of the first pinion shaft insertion hole.

3. The vehicle differential apparatus according to claim 1, wherein
   the non-contacting surface of the first pinion shaft insertion hole of the each pinion is provided between the two sliding surfaces in the axis direction of the first pinion shaft insertion hole.

4. The vehicle differential apparatus according to claim 1, wherein
   lubricating oil is held between the non-contacting surface of the each pinion and the pinion shaft.

5. The vehicle differential apparatus according to claim 1, wherein
   an outside diameter of the end portion of the pinion shaft is set smaller than an inside diameter of the inner peripheral surface of the second pinion shaft insertion hole.

6. The vehicle differential apparatus according to claim 1, wherein
   the pinion shaft is constrained from moving in an axis direction of the pinion shaft and from rotating about an axis of the pinion shaft, and the pinion shaft is entirely housed in the differential case.

7. The vehicle differential apparatus according to claim 1, wherein
   the two side gears each have a protruded portion or a recess portion for constraining the pinion shaft from rotating about an axis of the pinion shaft, and from moving in an axis direction of the pinion shaft; and
   the pinion shaft has a recess portion or a protruded portion that fits to the protruded portion or the recess portion of the each side gear.

8. The vehicle differential apparatus according to claim 1, wherein
   the pinion shaft is disposed at such a position as not to constrain rotation of the two side gears.

9. The vehicle differential apparatus according to claim 1, wherein:
   the each of the two pinion inner peripheral surface-supporting portions of the pinion shaft includes a first pinion inner peripheral surface-supporting portion, and a second pinion inner peripheral surface-supporting portion; and the first pinion inner peripheral surface-supporting portion and the second pinion inner peripheral surface-supporting portion are juxtaposed with a predetermined interval in an axis direction of the pinion shaft.

10. The vehicle differential apparatus according to claim 9, wherein:

the differential case has a pair of pinion outer peripheral surface-supporting portions that slidably support outer peripheral surfaces of the two pinions, respectively;

a first distance from a rotation axis line of the differential case to one of the pinion outer peripheral surface-supporting portions in a radial direction of the differential case is set larger than a second distance from the rotation axis line of the differential case to one of meshing center points at which the two pinions mesh with the two side gears in the radial direction of the differential case;

a third distance from the rotation axis line of the differential case to one of the first pinion inner peripheral surface-supporting portions of the two pinion inner peripheral surface-supporting portions in the radial direction of the differential case is set larger than the second distance; and a fourth distance from the rotation axis line of the differential case to at least a portion of one of the second pinion inner peripheral surface-supporting portions of the two pinion inner peripheral surface-supporting portions is set smaller than the second distance.

* * * * *